March 19, 1963 M. A. MEYER 3,082,417
SIGNAL SELECTION SYSTEM
Original Filed Sept. 10, 1956 4 Sheets-Sheet 1

FIG. 1

INVENTOR
MAURICE A. MEYER
BY Joseph Weingarten
ATTORNEY

United States Patent Office 3,082,417
Patented Mar. 19, 1963

3,082,417
SIGNAL SELECTION SYSTEM
Maurice A. Meyer, Natick, Mass., assignor to Laboratory for Electronics, Inc., Boston, Mass., a corporation of Delaware
Original application Sept. 10, 1956, Ser. No. 610,444. Divided and this application Sept. 20, 1956, Ser. No. 611,811
20 Claims. (Cl. 343—8)

The present invention relates in general to signal switching apparatus and in particular to a microwave signal source which provides coherent microwave signals during alternate time intervals. When used in a pulsed Doppler radar system as described in the co-pending applications of Maurice A. Meyer entitled Doppler Radar System and Radar System, Serial No. 610,444 and 610,-443, respectively, filed September 10, 1956, the latter now U.S. Patent No. 2,982,956, the Doppler frequency shifts in the returned energy from a plurality of radiated pencil beams may be independently detected for each beam. This application is a division of the former of the two co-pending applications.

An application for coherently generated signals is well known in the art of moving target indication (MTI) radar systems wherein the echo signals from moving targets are recognized by sensing the Doppler frequency shift associated with the signal return from a moving target. By comparing the frequency of the signal return with the frequency of a signal from a cohered oscillator whose phase is locked with the phase of the previously transmitted pulse of microwave energy, a Doppler frequency shift may be sensed. The circuitry to accomplish this result is complex and critical to adjust. Yet, if Doppler frequency shifts are to be sensed, a signal which is coherent with the transmitted signal must be provided as a reference for determining the extent of the frequency shift in the returned signal.

Thus, in prior art pulsed Doppler radar navigational systems wherein depressed beams are oriented forward and rearward relative to the carrying aircraft and a pulsed magnetron generates the microwave energy for radiation, it was necessary to determine the Doppler frequency shift by mixing the signal returns from the forward and rearward beams to derive a signal with audio frequency components indicative of the Doppler frequency shift. If the forward beam were radiating upon a hill while the rearward beam were radiating into a valley, the signal return from the former would arrive before that from the latter. If the beams were pencil beams, then there would not be an interval in which simultaneous returns from both beams were available and no Doppler frequency shift would be detected for the previously radiated pulse. To avoid this difficulty, the prior art systems radiated beams having a wide dimension substantially along a hyperbola of constant Doppler frequency shift. Thus, energy returned from the earth during a time interval much greater than the duration of the transmitted pulse. This arrangement dictates a requirement for an increase in the radiated power to attain a given sysetm sensitivity. Furthermore, independent detection of the Doppler frequency shift present in each beam is impossible.

Accordingly, it is a primary object of the present invention to provide a source of coherent microwave signals which enables the Doppler frequency shifts present in the signal return from a plurality of radiated pencil beams to be separately detected.

Another object of the invention is the provision of means for switching a high frequency signal.

A further object of the invention is the provision of means for generating a series of pulses of high frequency energy wherein each high frequency cycle is coherent with every other one; that is to say, times of maximum positive signal amplitude are separated by an integral multiple of the period of a high frequency cycle.

Still another object of the invention is to provide a pair of microwave signals of different frequencies in accordance with the preceding object.

It is another object of the invention to provide a pair of microwave signals in accordance with the foregoing object which are suitable for use as radiated and local oscillator signals respectively in a microwave transceiver and are separated in frequency by an intermediate frequency different from the frequency of any of the other fixed frequency signals present in the transceiver and associated system.

An additional object of the invention is the provision of radiated and local oscillator signals during alternating time intervals in accordance with the above object.

It is still another object of the invention to achieve the foregoing object in response to a gating signal coherently generated with respect to other fixed frequency signals present in the system.

One broad aspect of the invention resides in the method of switching a high frequency output signal derived by mixing a first high frequency signal with a second signal of lower frequency. A mixer is continuously energized with the first signal and the output signal is switched on and off by respectively applying to and removing from the mixer, the second signal.

In another aspect of the invention there are provided sources of a first relatively high frequency signal and a plurality of lower frequency signals. Associated with each lower frequency signal is a mixer having first and second inputs. The first inputs are continuously energized with the first high frequency signal, and the second inputs are selectively energized with respective lower frequency signals. In a preferred form, the lower frequency signals are coherently generated.

In a more specific form which the invention takes, there are two mixers and a source of a gating signal. The coherently generated lower frequency signals are applied to the mixers in response to the gating signal during alternating mutually exclusive time intervals. Associated with each mixer, is a filter for selectively passing a desired modulation product signal derived from the mixing process. The gating signal is preferably coherent with the lower frequency signals.

In a representative embodiment of the invention for use with a pulsed Doppler radar system, coherent transmitted and local oscillators signals are provided during mutually exclusive alternating substantially equal time intervals. A stable microwave signal is continuously applied to a first input of first and second microwave mixers. First and second high frequency signals, differing in frequency by an intermediate frequency, are applied to respective second inputs of the microwave converters during mutually exclusive alternating substantially equal time intervals in response to the gating signal. First and second microwave filters selectively pass desired sum or difference frequency signals from respective mixers, the selected signals being utilized as transmitted and local oscillator signals respectively. Means are provided for amplifying the transmitted signal. The aforesaid intermediate frequency is preferably different from the frequency of other fixed frequency signals present in the associated system.

Other features, objects and advantages will become apparent from the following specification when read in connection with the accompanying drawing in which.

Figure 1:
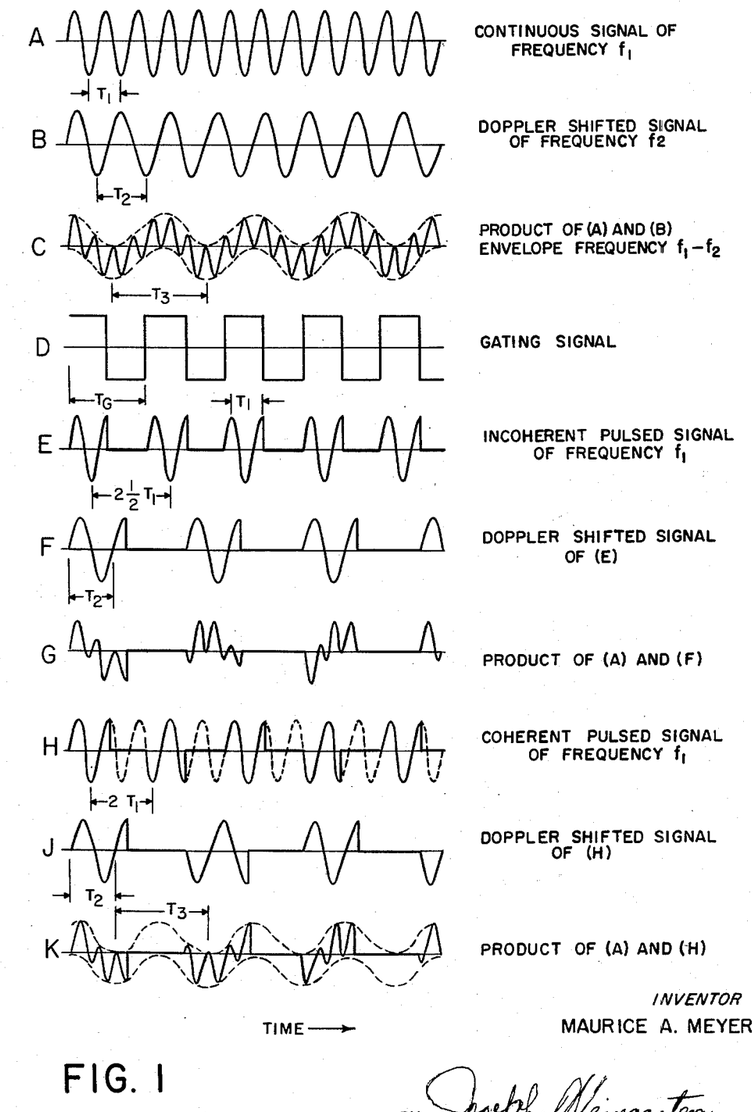
FIG. 1 is a graphical representation of signal waveforms as a function of time, which are helpful in understanding the importance of coherently generated signals.

With reference now to the drawing and more particularly, FIG. 1 thereof, a group of signal waveforms are graphically represented as a function of time relative to a common time axis. The waveforms there illustrated are helpful in understanding the desirability of utilizing coherently generated signals in a pulsed Doppler radar system. The frequencies, periods and amplitudes in FIG. 1 have been chosen to conveniently demonstrate the principles of coherent signal generation and do not necessarily represent practical relative values among the various indicated signals for the respective quantities.

Referring to FIG. 1A, there is illustrated a portion of a continuous wave signal having a frequency $f_1$ and corresponding period $T_1$ which is a typical signal waveform generated for use in a C.-W. radar system. If such a signal is radiated from a source directed toward a surface and there is relative motion between the source and surface, the signal returned to the source from the surface will have a Doppler frequency shift proportional to the relative velocity component along the direction of radiation. If the distance between source and surface is increasing, the frequency $f_2$ of the returned signal will be less than that of the transmitted signal, as illustrated in FIG. 1B.

Figure 2:
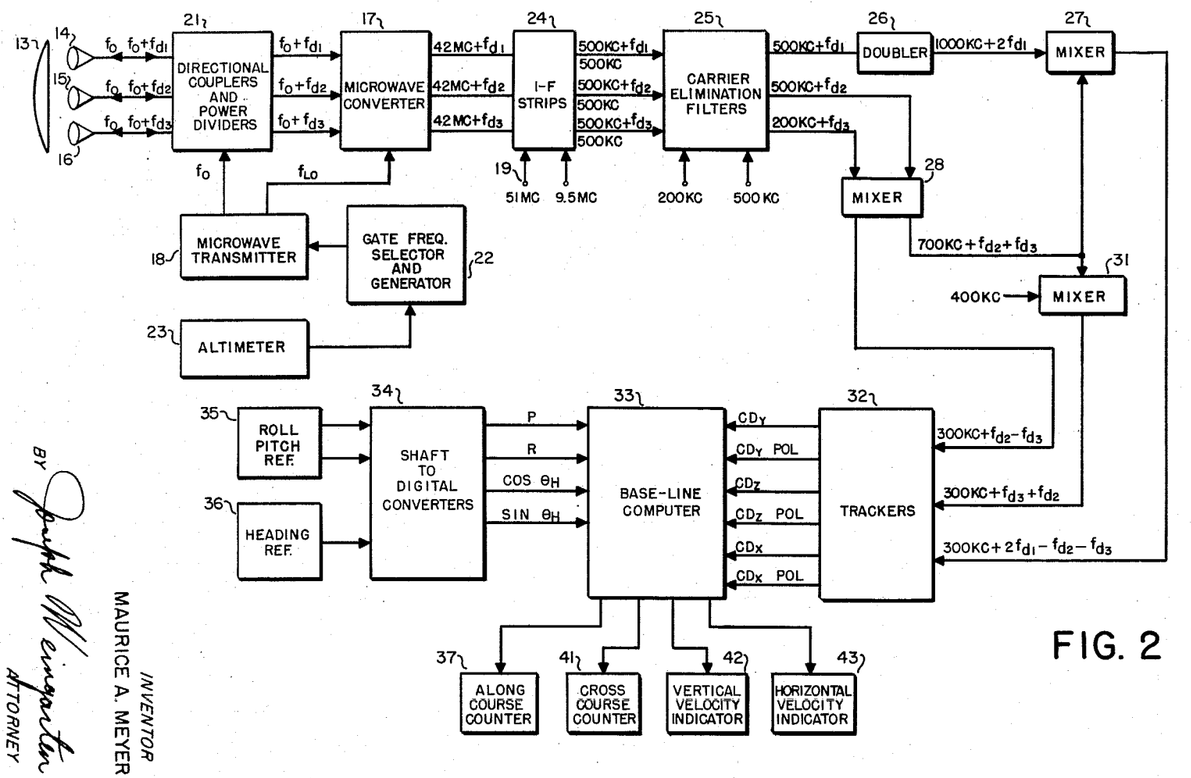
FIG. 2 is a block diagram of a representative embodiment of an airborne Doppler radar navigational system.

One method of deriving a signal indicative of the amount of Doppler frequency shift utilizes a mixer which is energized by the C.-W. transmitted signal of frequency $f_1$, illustrated in FIG. 1A, and the returned signal of frequency $f_2$, illustrated in FIG. 2B to derive an output product signal, illustrated in FIG. 1C. The envelope of the latter signal is indicated by dotted lines and is seen to have a period $T_3$ which corresponds to a frequency $f_1-f_2$, the Doppler frequency shift. This low frequency signal may be recovered by applying the product signal of FIG. 1C to a low pass filter.

In a pulsed Doppler radar system, bursts of high frequency energy are radiated in response to a gating signal, the duration of the burst being large compared to a cycle of high frequency energy. In conventional radar systems, the source of such bursts is typically a pulsed magnetron which provides high frequency energy bursts randomly phased from pulse to pulse; that is to say, points of maximum amplitude of one polarity in one burst are generally separated from corresponding points in another burst by a time interval which is different from an integral multiple of the period of the high frequency signal. This occurs because initiation of each burst in response to the gating signal always commences from zero with the same initial slope.

This will be better understood from observing the incoherently generated bursts, illustrated in FIG. 1E, in response to the gating signal of FIG. 1D, which initiates a 50% transmitted duty cycle offering advantages described in the aforesaid co-pending applications. In order to more clearly illustrate characteristics of coherent and noncoherent generation, the period $T_G$ of the gating signal is illustrated as only 2.5 times $T_1$, it being understood that in practice, where the bursts are of microwave energy, $T_G$ is much longer than $T_1$. In FIG. 1E, it is seen that each burst is initiated from zero with the same positive initial slope. During intervals coincident with positive portions of the gating signal waveform, 1¼ cycles of energy of freqency $f_1$ are generated for radiation. The return signal having a frequency of $f_2$ and bearing the same relation to the pulse train of FIG. 1E as the return signal of FIG. 1B bears to the radiated signal of FIG. 1A, is illustrated in FIG. 1F. When the latter signal is mixed with the signal of FIG. 1A, the product signal of FIG. 1G is derived. Note that the latter product signal is bounded by a random envelope; hence, determination of a Doppler frequency shift therefrom is virtually unattainable.

In FIG. 1H there is illustrated a coherently generated pulse train with each burst also consisting of 1¼ cycles of a signal of frequency $f_1$. However, in this case while each burst is initiated from zero amplitude as a result of the gating signal having a positive going polarity reversal coincident with every fifth positive going polarity reversal of the signal of frequency $f_1$, adjacent bursts are initiated with slopes of opposite sense. Thus, the first, third and fifth bursts are initiated with positive slope while the second and fourth bursts are initiated with negative slope. As the dotted lines indicate, the signal waveform of FIG. 1H may be superimposed upon that of FIG. 1. It is also seen that negative and positive signal peaks are separated from the negative and positive peaks respectively of every other burst by an integral multiple of the period $T_1$ The return signals having a frequency of $f_2$ and bearing the same relation to the pulse train of FIG. 1H as the return signals of FIGS. 1B and 1F bear to the signals of FIGS. 1A and 1E respectively is illustrated in FIG. 1J. When the latter return signal is mixed with the signal of FIG. 1A, the output product signal illustrated in FIG. 1K is derived. Note that now an envelope indicated by the dotted line and having a period of $T_3$, corresponding to the correct Doppler frequency shift, bounds the latter product signal.

The above discussion was for illustration only. As a practical matter, mixing a fixed frequency signal with a signal return from incoherently generated radiated pulses of microwave energy would yield a product signal having an envelope completely unrelated to the Doppler frequency shift. This will be better understood when practical values of periods for the various signals are considered. For example, a typical radiated signal might have a frequency of 10,000 mc., the corresponding period being $10^{-4}$ microseconds, and emanate from a source having a velocity relative to an illuminated surface such that the Doppler frequency shift in the returned signal is 100 cycles, corresponding to a period of $10^4$ microseconds. A typical gating signal frequency is 50 kc., corresponding to a positive pulse duration of 10 microseconds.

Thus, the pulsed system may be considered as a sampled data system wherein the Doppler frequency shift is sampled during alternate 10 microsecond time intervals to derive points of the 100 cycle difference frequency signal. If the sampling is coherent, then a faithful reproduction of the 100 cycle signal is obtained. But if the sampling is incoherent, then the resultant signal corresponds essentially to that which would be derived from the random sampling of a sine wave, the amplitude probability density distribution of randomly sampling a sine wave of unity peak amplitude being $$\frac{1}{\Pi(1-x^2)}$$

where $x$ is the amplitude and may vary from 0 to ±1.

With the above signal parameters, each high frequency burst includes $10^5$ cycles of microwave energy. One way of cohering the energy from pulse to pulse would be to control the gating pulse duration to be exactly 10 microseconds so that the high frequency burst always terminated at zero with the same slope from burst to burst. But this would require maintaining the gating pulse width to within a tolerance considerably less than $10^{-4}$ microseconds. Stated in terms of deviation divided by pulse width, the tolerance must be much less than $$\frac{10^{-4}}{10}$$

or much less than .001%. Such a tolerance is attainable only with costly, bulky circuitry requiring critical alignment.

Before describing in detail the novel method by which coherence is obtained in the present system, it is appropriate to first describe a Doppler radar system which advantageously utilizes coherently generated signals. Such a system is illustrated in FIG. 2. A microwave lens 13 is energized by radiated energy from conical horns 14, 15 and 16, the latter horns being coupled to microwave converter 17 and microwave transmitter 18 by the directional couplers and power dividers 21. Transmitter 18 generates a transmitted signal of frequency $f_0$ and local oscillator signal of frequency $f_{L0}$ during alternate mutually exclusive intervals in response to gating pulses from gate generator 22, the frequency of this signal being controlled by altimeter 23. Converters 17, energized by the local oscillator signal, provides output signals for application to I.-F. strips 24 which are also energized by a pair of fixed frequency signals to provide an output signal to carrier elimination filters 25, displaced in the frequency spectrum from the input signal, but retaining the Doppler frequency shifts. The latter filters are also energized by fixed frequency signals that are utilized as carrier signals upon which the Doppler frequency shifted signals are modulated. One output from filters 25 is applied to a frequency doubler 26 whose output is applied to a mixer 27. The other two output signals from filters 25 are applied to mixer 28 to provide sum and difference frequency signals, the sum signal being applied to mixers 27 and 31 while the difference frequency signal is directly applied to one channel of the trackers 32. The other input to mixer 31 is a fixed frequency signal to effect an output from the latter mixer which includes the desired Doppler frequency shifted signals disposed about a carrier signal, enabling the trackers to respond to the Doppler frequency shifts. The mixer 31 output signal is applied as a second signal input to trackers 32. The third signal for application to the tracker is derived from the output of mixer 27.

The output of the trackers include signals whose frequency shifts are proportional to the three generalized Doppler variables $D_x$, $D_y$ and $D_z$ discussed in detail in the aforesaid parent application, together with a polarity indication for each variable to indicate the sense of the associated Doppler shift. The signals are applied to the base line computer 33 which also receives signals from shaft-to-digital converters 34, indicative of pitch angle, roll angle, and the sine and cosine of the aircraft azimuthal heading angle. The shaft-to-digital converters 34 couple to the computer in digital form, the analog information derived from roll and pitch reference 35 and heading reference 36. The output of base line computer 33 energizes an along course counter 37, which indicates the distance traveled along the course from the starting point or other reference point, a cross course counter 41 which indicates the magnitude and direction of deviation across the selected course line, and vertical and horizontal velocity indicators 42 and 43 respectively which indicate magnitude and direction of aircraft velocity in elevation and azimuth respectively.

Having discussed the system arrangement, its mode of operation will be described. When gate generator 22 renders microwave transmitter 18 operative for the generation of a microwave signal of frequency $f_0$, the latter signal is coupled through power dividers and directional couplers 21 to each conical horn 14, 15 and 16 which respectively radiate beams through lens 13 which are focused into pencil beams by the lens. Energy returned from the three beams is focused by the lens upon the respective horns from which the energy emanated. The directional couplers 21 direct the returned energy, which includes the transmitted frequency $f_0$ plus the Doppler frequency shifts $f_{d_1}$, $f_{d_2}$, $f_{d_3}$ from the beams respectively associated with horns 14, 15 and 16 to microwave converter 17. In microwave converter 17, the three received signals are mixed with a local oscillator signal to provide the signals with the Doppler frequency shifts, transposed in frequency about a 42 mc. I.-F. frequency as indicated, for amplification by respective channels in I.-F. strips 24. Fixed frequency signals of 51 mc. and 9.5 mc. are also applied to the latter strips and the difference frequency signal is mixed with the 42 mc. signal to provide outputs which include the Doppler frequency shifts about 500 kc.

As indicated above, a pulsed system is normally arranged so that the receiver is off when the transmitter is on. Thus, the 500 kc. carrier signal is usually not present. The exception occurs at very low altitudes when the pulse repetition frequency is at its highest value. Since energy from transmitted pulses returns almost instantaneously, the receiver is deliberately rendered operational during a portion of the interval in which a pulse is transmitted. During this interval, 500 kc. carrier signal is present in the I.-F. strips output signal. However, the proximity of the aircraft to the ground results in a signal return of sufficient strength to overcome the effects of carrier leakage after selective filtering by carrier elimination filters 25.

The signals from I.-F. strips 24 are applied to the carrier elimination filters 25. Each filter is preferably of the type described in the co-pending application of M. A. Meyer, entitled "Selective Circuit," Serial No. 329,803, filed January 6, 1953, now U.S. Patent No. 2,909,656, and are as illustrated in FIG. 1 thereof with respect to filters having $f_{d_1}$ and $f_{d_2}$ in the outputs. However, since it is desired that the signal output having the $f_{d_3}$ Doppler component be relatively close to 200 kc., the single side band modulator 25 in FIG. 1 of the aforesaid application is energized by quadrature components of a 200 kc. fixed frequency signal instead of the reference signal quadrature components as indicated therein.

The signal component containing $f_{d_1}$ is applied to doubler 26 to provide an output signal having a frequency component of 1000 kc.$+2f_{d_1}$. The other two output signals from the carrier elimination filters, having components including $f_{d_2}$ and $f_{d_3}$ about 500 and 200 kc. respectively, are applied to mixer 28 to provide a difference frequency signal of 300 kc.$+f_{d_2}-f_{d_3}$ which is applied to one input of the trackers 32. The sum signal from mixer 28, having 700 kc.$+f_{d_2}+f_{d_3}$ is applied to mixer 27, and the difference frequency output therefrom, $$300 \text{ kc.}+2f_{d_1}-f_{d_2}-f_{d_3}$$

applied to another input of the trackers 32. The sum signal from mixer 28 is also applied to mixer 31, which has a second input energized by a 400 kc. fixed frequency signal. The difference frequency signal therefrom is applied as the remaining input signal to the trackers 32.

Figure 3:
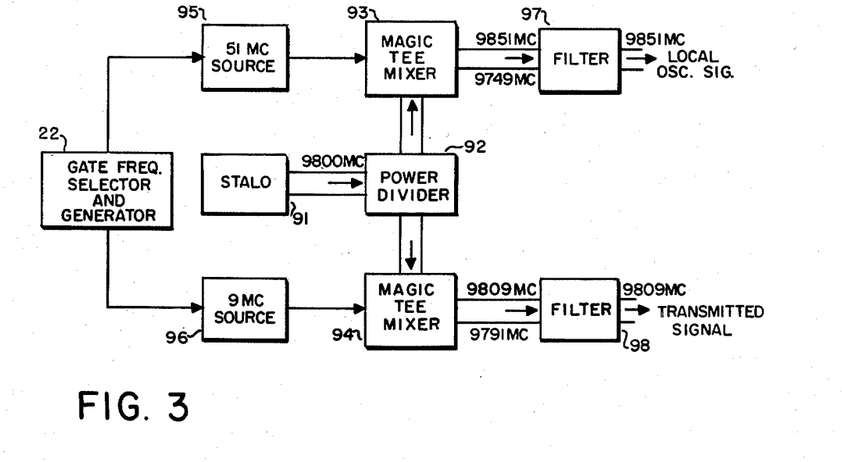
FIG. 3 is a block diagram of a representative embodiment of the invention.

With reference to FIG. 3, a preferred form of microwave transmitter 18 of FIG. 2 is depicted in block diagram form. While conventional microwave signal sources may be used to generate the radiated and local oscillator signals, the preferred embodiment of microwave transmitter 18 has features which are especially advantageous in connection with Doppler navigational systems. These advantages will be better understood after the discussion of the arrangement of the transmitter and its mode of operation. Microwave transmitter 18 is seen to comprise a stable local oscillator 91 which energizes magic tee mixers 93 and 94 through a power divider 92. Mixers 93 and 94 are also energized by 51 mc. and 9 mc. sources 95 and 96 respectively. The latter signal sources emit signals during alternating mutually exclusive time intervals in accordance with a gating signal from gate frequency selector and generator 22. The outputs of mixers 93 and 94 are applied to filters 97 and 98 respectively, the output signals from the latter filters being applied to microwave converter 17 and directional couplers and power dividers 21 respectively of FIG. 2. Stalo 91 is a stable microwave oscillator preferably of the type wherein a servo control system, which includes a discriminator cavity, maintains the oscillator frequency at substantially the center frequency of the cavity. Other stable oscillators, such as the type employing a relatively low frequency crystal oscillator energizing a chain of frequency multipliers may also serve as the stable local oscillator.

In this example, the output signal from the stable local oscillator is a 9800 mc. microwave signal and is applied through microwave coupling means to power divider 92 which channels portions of the input power through microwave coupling means to magic tee mixers 93 and 94. Although other mixing means may be employed, each mixer is preferably of the type employing semiconductor diodes in a magic tee arrangement which precludes energy from being coupled back to power divider 92. When source 95 responds to the gating signal from gate generator 22 with a 51 mc. output signal, mixer 93 is also energized by the latter to provide an output signal which includes sum and difference frequency signals of 9851 mc. and 9749 mc. respectively. A filter 97 rejects all but the 9851 mc. signal and the latter serves as the local oscillator signal for application to a power divider 21 in FIG. 2. When the signal from gate generator 22 maintains source 95 in the inactive state, the only output from mixer 93 is a 9800 mc. signal which is rejected by filter 97; hence, there is no local oscillator signal and microwave converter 17 (FIG. 2) is effectively inoperative. Accordingly, receiving apparatus, which includes converters 17 and I.-F. strips 24, is then insensitive to received signals. To more completely desensitize the receiving apparatus during the transmitting interval, the 51 mc. source 95 is coupled to terminal 19 of the I.-F. strips 24 in FIG. 2, there normally being no 51 mc. signal then applied to terminal 19 during the interval a pulse is transmitted. A further result is a reduction of noise to signal ratio of substantially 3 db because thermal noise at the input circuits of the I.-F. strip is eliminated during these intervals.

When the signal from gate generator 22 activates source 96, mixer 94 is also energized by a 9 mc. signal to provide a signal output which includes sum and difference frequency signals of 9809 mc. and 9791 mc. respectively. Filter 98 rejects substantially all but the 9809 mc. signal to provide a transmitted signal of 9809 mc. at the output which is applied to a power divider 21 in FIG. 2. When the gating signal from generator 22 disables signal source 96, the only output signal from mixer 94 is a 9800 mc. signal which is rejected by filter 98. No signal is transmitted during this interval. Filter 98 preferably includes a commercially available V27 amplifier to raise the power level of the transmitted signal.

It is seen that this novel arrangement provides the desired alternate operation of transmitter and receiver at microwave frequencies by controlling the emission of relatively low frequency signals. Stalo 91 continues to emit at all times; hence, no stability problems are presented with respect to the primary microwave signal frequency source. It is relatively easy to gate the 51 mc. and 9 mc. sources without affecting the frequency stability of their output signal. Thus, two stable microwave signals are supplied whose frequency difference is the desired high frequency of the receiver I.-F. strips. Since both signals are derived from Stalo 91 any drift in the output frequency of the latter causes no change in the difference frequency signal. The stability of the latter is dependent only on the stability of the 9 and 51 mc. signal sources, which frequencies may be controlled within tight tolerances by utilizing well-known crystal oscillator techniques.

As indicated above, the preferred system includes a time-shared transmitter-receiver; that is, when the transmitter is on the receiver is off and vice versa. This type of operation effects increased system sensitivity. With C-W Doppler systems the return signal must be high enough to override carrier leakage signals from the transmitter, but with the system described herein the receiver is operative during intervals when no carrier signal is radiated; hence, substantially all the gain of the receiver may be utilized for responding to the returned signal. The particular embodiment preferred for effecting this duplexer type of arrangement utilizes a stable microwave signal source which continually generates a primary microwave signal whose frequency is different from that of the transmitted signal, thus enabling the latter source to remain on at all times, the receiver being insensitive to its output frequency, even though portions might leak to the receiver.

As indicated above, another feature of the present system is the utilization of coherent fixed frequency signals. The signals of frequency 200 kc., 500 kc., 700 kc., 9 mc., 9.5 mc. and 51 mc. are all generated from the same basic timing oscillator source by utilizing a combination of harmonic generators and mixers of the type well known in the art. Since both the local oscillator and transmitted signals are derived by combining the same stable microwave signal with one of the coherently generated signals, the transmitted signal and all signals in the receiving system are coherent; hence, despite the frequency translation of the returned Doppler frequency-shifted spectra within the receiving system, precise retention of the Doppler frequency shifts relative to an appropriate reference frequency is readily obtained.

With the coherent arrangement of the present system, frequency shifts present in the signal return from each beam can be independently detected. As a result, pencil beams may be radiated to effect an increase in system sensitivity for a given radiated power. A further advantage is that the Doppler frequency-shifted spectra may be tracked at relatively high frequencies, eliminating the problems encountered in connection with spectrum foldover described in the parent application.

A feature of the present system is the utilization of a 50% duty cycle; that is, the duration of each radiated pulse is substantially equal to the time interval between pulses. Accordingly, reflected energy is returned to the receiver for a longer period of time as compared with prior art low duty cycle pulsed radar systems where the interval between radiated pulses greatly exceeds the pulse duration. Furthermore, by controlling the pulse repetition rate in accordance with the aircraft altitude so that as the transmitted pulse ends, the reflected energy from the leading edge thereof returns to the aircraft, the receiver may operate at maximum sensitivity while responding to substantially the entire reflected pulse.

Another advantage of the 50 percent duty cycle of the present invention is the nature of the frequency spectrum thereby radiated. Most of the energy is in sidebands relatively close to the carrier frequency. Accordingly, even the prior art systems, which track at relatively low frequencies, would be supplied with more low frequency energy in the signal return if a high duty cycle were employed, thereby increasing system sensitivity. The relatively narrow radiated pulses of the prior art systems have a spectral distribution wherein a substantial portion of the radiated energy is in the higher order sidebands, which is all discarded by the low pass filter arrangement used therein to alleviate the ambiguity problem discussed in the aforesaid copending application in connection with spectrum foldover.

Figure 4:
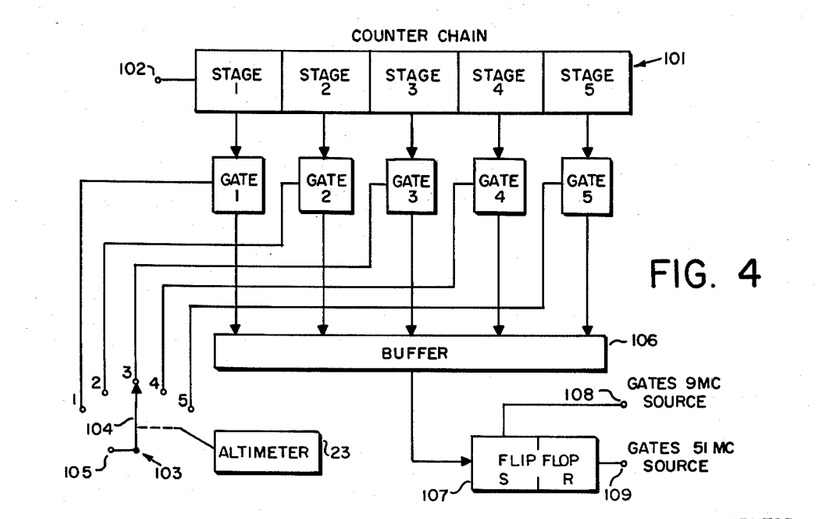
FIG. 4 is a block diagram of an altimeter controlled gate frequency selector and generator.
Figure 5:
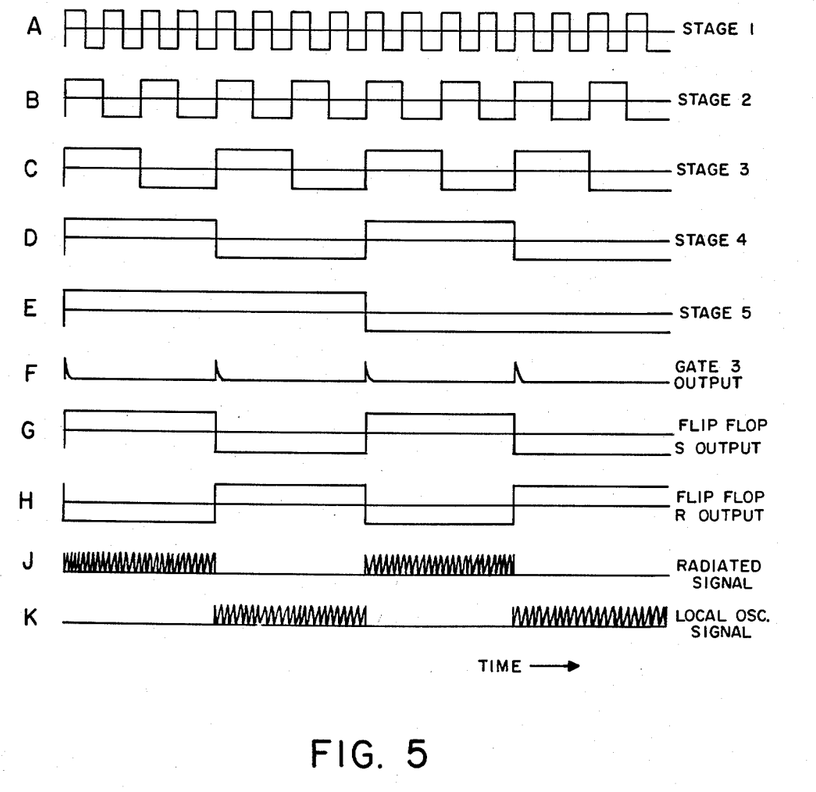
FIG. 5 is a graphical representation of signal waveforms plotted as a function of time and pertinent to the understanding of the apparatus illustrated in FIGS. 3 and 4.

Operation of the aforesaid system will be better understood from the following discussion of the system block diagram in FIG. 4, and the signal wave forms graphically represented as functions of time in FIG. 5. With reference to FIG. 4, there is illustrated in block diagram form, gate frequency selector and generator 22 of FIGS. 2 and 3 arranged to cooperate with altimeter 23 of FIG. 2. A counter chain 101 is energized on terminal 102 by the 500 kc. signal utilized elsewhere in the system illustrated in FIG. 2. The output of each counter stage is coupled to a gate whose other input is connected to a terminal on switch 103, each terminal and gate bearing a number which corresponds to the associated counter stage. The arm of switch 104 is coupled to a source of positive potential at terminal 105 and actuated by the shaft of altimeter 23. The outputs of the gates are coupled to buffer 106 which in turn energizes flip-flop 107. The S output of flip-flop 107 at terminal 108 is coupled to the 51 megacycle source 95 in FIG. 11, while the R output thereof on terminal 109 is coupled to the 9 megacycle source 96.

Referring to the signal wave forms of FIG. 5, the mode of operation of the system of FIG. 4 will be described. Counter stage 101 is energized at stage 1 by the 500 kc. signal utilized elsewhere in the system. Stage 1 responds to this input signal with a plate signal wave form illustrated in FIG. 5A. The remaining stages respond to the signals from the preceding stage to provide plate signal waveforms illustrated in FIGS. 5B, 5C, 5D and 5E. Each of these plate waveforms is differentiated and applied to an associated gate. The arm of switch 104 is actuated by movement of the shaft of altimeter 23, the system being arranged so that arm 104 connects terminal 105 to switch position 1 when the altimeter indicates 0–2000 feet, to switch terminal 2 when 2000–4000 feet is indicated, to switch terminal 3 when 4000–8000 feet is indicated, to switch terminal 4 when 8000–16000 feet is indicated, and to switch terminal 5 when readings above 16000 feet are indicated. When a switch terminal is connected to terminal 105, a corresponding gate is activated and output pulses therefrom are coupled to buffer 106 which in turn couples pulses to flip-flop 107. For example, with arm 104 connected to switch terminal 3 as illustrated, the gate 3 output pulses illustrated in FIG. 5F are coupled through buffer 106 to flip-flop 107, the latter responding by providing as an output signal on terminals 108 and 109 the plate waveforms from the S and R sections respectively illustrated in FIGS. 5G and 5H. The latter two waveforms are of opposite phase and are respectively applied to the 9 mc. source 96 and the 51 mc. source 95 to control their respective outputs. In response to the two gating signals from flip-flop 107, the output signals from filters 98 and 97 of FIG. 3 are as illustrated in FIGS. 5J and 5K respectively. Thus, bursts of a signal for radiation and local oscillator signal are coherently generated for equal durations, but during mutually exclusive alternating time intervals.

The reason for varying the pulse repetition rate in steps is to avoid unwanted modulation products in the received signal. As indicated in FIG. 1, the input signals to the carrier elimination filters 25 include a 500 kc. component. Since the generated microwave signals are pulsed at a sub-harmonic of 500 kc., the received signal also contains a 500 kc. harmonic of the pulse repetition frequency. However, since the gating signal is derived from the same 500 kc. source which energizes the rest of the system, the harmonics at 500 kc. are in phase with other 500 kc. signals present and introduce no additional frequency-shifted components which might erroneously be detected as Doppler shifts. It has been discovered that utilization of the indicated technique of halving the pulse repetition rate when the indicated altitude is doubled results in adequate system sensitivity.

Although this gating system has been described in connection with a conventional electron tube flip-flop counter chain and a vacuum tube flip-flop 107, the novel concepts may be embodied utilizing other bistable circuits such as transistor and/or magnetic core circuits which perform similar functions and altimeter information may be supplied from any suitable altitude indicating device.

At low altitudes where the transmitted and returned signals overlap and it is desired to render the receiver operative during the intervals in which a pulse is transmitted, means may be provided for coupling a source of positive gating potential to the 51 mc. source 95 continuously instead of the signal waveform on output terminal 109. The latter means may be manually operated or responsive to an altimeter indication less than a predetermined value.

In connection with the foregoing description of a preferred embodiment of the invention, specific frequencies and component arrangements have been described by way of example only. Those skilled in the art may make numerous modifications of and departures from the specific apparatus described herein without departing from the disclosed inventive concepts. Consequently, the invention is to be construed as limited only by the spirit and scope of the appended claims.

What is claimed is:

1. A pulsed Doppler radar system comprising, a source of a stable microwave signal and coherently generated first and second high frequency signals, a source of a gating signal, first and second microwave mixers continuously energized by said stable microwave signal, means responsive to said gating signal for alternately applying said first and second high frequency signals respectively to said first and second microwave mixers to provide respective first and second microwave output signals during mutually exclusive time intervals, means for radiating said first microwave output signal, means for receiving the Doppler frequency-shifted energy returned from the radiated first signal, and means for mixing the returned energy with said second microwave output signal to derive an intermediate frequency signal which retains the Doppler frequency shift present in the returned energy.

2. Selective signalling apparatus comprising, a source of a first relatively high frequency signal, means for generating a plurality of lower frequency signals, said lower frequency signals being coherently related one to another, a mixer associated with each of said lower frequency signals and having first and second inputs, means for continuously energizing said first inputs with said first high frequency signal, and means for selectively applying each of said plurality of lower frequency signals to an associated second input.

3. Selective signalling apparatus comprising, sources of a first relatively high frequency signal and a plurality of coherently generated lower frequency signals, associated with each of said lower frequency signals, a mixer having first and second inputs, means for continuously energizing said first inputs with said first high frequency signal, associated with each mixer a filter for selectively passing a desired modulation product signal derived by mixing said first signal with the associated lower frequency signal, and means for selectively applying each of said lower frequency signals to an associated second input to selectively provide the respective desired modulation product as an output signal from the associated filter.

4. Selective signalling apparatus comprising, sources of a first relatively high frequency signal and first and second coherently generated lower frequency signals, first and second mixers each having first and second inputs, means for continuously energizing said first inputs with said first high frequency signal, first and second filters respectively energized by said first and second mixers for selectively passing respective first and second modulation product signals derived by mixing said first high frequency signal respectively with said first and second lower frequency signals, and means for selectively applying said first and second lower frequency signals to a second input of said first and second mixers respectively.

5. Selective signalling apparatus comprising, a source of a first relatively high frequency signal, a source of coherently generated first and second lower frequency signals and a gating signal, first and second mixers each having first and second inputs, means for continuously energizing said first inputs with said first high frequency signal, and means responsive to said gating signal for applying said first and second lower frequency signals to a second input of said first and second mixers respectively during alternating mutually exclusive time intervals.

6. Selective signalling apparatus comprising, sources of a first relatively high frequency signal and a plurality of coherently generated lower frequency signals, mixing means for deriving a plurality of high frequency output signals by combining said first signal respectively with said lower frequency signals, and means for selectively providing said high frequency signals as an output by controlling the application of the respective lower frequency signals to said mixing means.

7. In a microwave signalling system apparatus comprising, sources of a stable microwave signal and first and second coherently generated high frequency signals, mixing means for deriving first and second microwave signals by combining said stable signal with said first and second high frequency signals respectively, and means for selectively providing one of said first and second microwave signals as an output by controlling the application of said first and second signals to said mixing means.

8. In a microwave signalling system apparatus comprising, a source of a stable microwave signal, sources of first and second high frequency signals for providing a first signal separated from said second signal by a constant difference frequency, first and second mixers, means for coupling said stable signal to said first and second mixers, and means for applying said first and second signals respectively to said first and second mixers during mutually exclusive time intervals.

9. In a microwave transceiver, apparatus comprising, first and second mixers, means providing a frequency stable microwave signal, means for generating first and second high frequency signals, said first and second signals differing by a constant difference frequency, means for coupling said stable signal to said first and second mixers, gate means for applying said first and second signals respectively to said first and second mixers during mutually exclusive time intervals to provide first and second modulation product signals respectively, and first and second filters respectively energized by said first and second modulation product signals and during mutually exclusive time intervals respectively providing first and second microwave output signals whose frequencies differ by said constant difference frequency.

10. In a microwave transceiver, apparatus comprising, a source of a stable microwave signal, sources of first and second high frequency signals separated in frequency by an intermediate frequency different from other fixed frequency signals present in said transceiver, first and second microwave mixers each having first and second inputs, means for continuously energizing said first inputs with said stable microwave signal, and means for alternately applying said first and second high frequency signals to respective second inputs of said first and second mixers to alternately provide first and second microwave output signals whose frequency difference is said intermediate frequency.

11. In a microwave transceiver, apparatus comprising, a source of a stable microwave signal, sources of first and second coherently generated high frequency signals separated in frequency by an intermediate frequency different from other fixed frequency signals present in said transceiver, first and second microwave mixers each having first and second inputs, means for continuously energizing said first inputs with said stable microwave signal, a source of a gating signal, and means responsive to said gating signal for alternately applying said first and second high frequency signals to respective second inputs of said first and second mixers to provide first and second coherent microwave output signals during alternate mutually exclusive time intervals whose frequency difference is said intermediate frequency.

12. A pulsed radar system comprising, a source of coherently generated transmitted and local oscillator high frequency signals, transmitting means responsive to said transmitted signal and capable of illuminating a surface with high frequency energy, receiving means utilizing said local oscillator signal and capable of responding to said radiated high frequency energy which is returned from said surface, a source of a periodic gating signal, means responsive to said gating signal for activating said transmitting and receiving means respectively during alternating time intervals, and means sensitive to the distance between the transmitting and receiving means and said surface for controlling the period of said gating signal whereby the latter period is increased or decreased stepwise in response to a predetermined stepwise increase or decrease respectively in the distance sensed.

13. A pulsed airborne Doppler radar system comprising, a source of coherently generated transmitted and local oscillator high frequency signals, transmitting means responsive to said transmitted signal and capable of radiation of high frequency energy, receiving means utilizing said local oscillator signal and capable of responding to said radiated high frequency energy which is returned from the surface of the earth, a source of a lower fixed frequency signal, said receiving means having intermediate frequency apparatus utilizing said lower fixed frequency signal, a source of a gating signal of a frequency which is a subharmonic of said lower fixed frequency, means responsive to said gating signal for activatinng said transmitting and receiving means respectively during alternating substantially equal time intervans, and means sensitive to stepwise system altitude changes for selecting said subharmonic.

14. A pulsed radar system comprising, a source of coherently generated transmitted and local oscillator high frequency signals, transmitting means responsive to said transmitted signal and capable of illuminating a surface with high frequency energy, receiving means utilizing said local oscillator signal and capable of responding to said radiated high frequency energy which is returned from said surface, a source of a periodic gating signal, means responsive to said gating signal for activating said transmitting and receiving means respectively during alternating time intervals, and means sensitive to the distance between the transmitting and receiving means and said surface for controlling the period of said gating signal whereby the latter period is increased or decreased in response to a predetermined increase or decrease respectively in the distance sensed.

15. A pulsed airborne Doppler radar system comprising, a source of coherently generated transmitted and local oscillator high frequency signals, transmitting means responsive to said radiated signal and capable of radiation of high frequency energy, receiving means utilizing said local oscillator signal and capable of responding to said radiated high frequency energy which is returned from the surface of the earth, a source of a gating signal, means responsive to said gating signal for activating said transmitting and receiving means respectively during alternating substantially equal time intervals, and means sensitive to system altitude changes for controlling the frequency of said gating signal.

16. In a microwave transceiver, apparatus comprising, first and second mixers, means providing a frequency stable microwave signal, means for providing first and second high frequency signals having a constant frequency difference therebetween, means for coupling said stable signal to first and second mixers, means for applying said first and second signals respectively to said first and second mixers to provide first and second modulation product signals, respectively, and first and second filters respectively energized by said first and second modulation product signals to provide first and second microwave output signals having said constant frequency difference therebetween.

17. In a microwave transceiver, apparatus comprising, a source of a stable microwave signal, sources of first and second high frequency signals separated in frequency by an intermediate frequency, first and second microwave mixers each having first and second inputs, means for continuously energizing said first inputs with said stable microwave signal, means for alternately applying said first and second high frequency signals to respective second inputs of said first and second mixers to alternately provide first and second microwave output signals whose frequency difference is said intermediate frequency, means for radiating said first microwave signal, means for receiving energy returned from said radiated first output signal, and means for mixing said received returned energy with said second microwave output signal to provide a difference frequency signal having spectral components displaced from said intermediate frequency by the Doppler frequency shift in said received returned energy.

18. Apparatus in accordance with claim 17 and further comprising, an intermediate frequency strip energized by said difference frequency signal and at least one of said first and second high frequency signals to provide said difference frequency signal transposed in frequency, said one of said first and second high frequency signals being prevented from energizing said intermediate frequency strip except when said second microwave output signal is provided.

19. Selective signaling apparatus comprising, a source of a first relatively high frequency signal, means for providing a pair of lower frequency signals having a constant difference frequency therebetween, means for providing respective pulse trains of said lower frequency signals, a mixer associated with each of said lower frequency pulse trains and having first and second inputs, means for continuously energizing said first inputs with said first high frequency signal, and gate means for selectively applying each of said lower frequency pulse trains to an associated second input.

20. Apparatus in accordance with claim 19 wherein said gate means cause said second inputs to be energized during mutually exclusive time intervals.

References Cited in the file of this patent

UNITED STATES PATENTS

| | | |
|---|---|---|
| 2,479,568 | Hansen | Aug. 23, 1949 |
| 2,485,583 | Ginzton | Oct. 25, 1949 |
| 2,517,549 | Earp | Aug. 8, 1950 |
| 2,538,068 | Williams | Jan. 16, 1951 |
| 2,543,449 | Emslie | Feb. 27, 1951 |
| 2,586,028 | Grayson | Feb. 19, 1952 |
| 2,598,689 | Hansen et al. | June 3, 1952 |
| 2,614,250 | Stodola | Oct. 14, 1952 |
| 2,666,141 | Clapp | Jan. 12, 1954 |
| 2,695,404 | Barker | Nov. 23, 1954 |
| 2,738,502 | Armstrong et al. | Mar. 3, 1956 |